United States Patent [19]

Schmoock

[11] Patent Number: 4,462,060
[45] Date of Patent: Jul. 24, 1984

[54] CONSTANT-CURRENT DUTY-CYCLE DRIVER FOR ELECTROMAGNETIC FLOWMETER

[75] Inventor: Roy F. Schmoock, Yardley, Pa.
[73] Assignee: Fischer & Porter Company, Warminster, Pa.
[21] Appl. No.: 442,135
[22] Filed: Nov. 16, 1982
[51] Int. Cl.³ .............................................. G01F 1/58
[52] U.S. Cl. ................................... 361/154; 361/178; 73/861.12; 73/861.17
[58] Field of Search ............... 361/152, 153, 154, 155, 361/157, 178; 73/861.12, 861.17

[56] References Cited

U.S. PATENT DOCUMENTS

| | | | |
|---|---|---|---|
| 3,783,687 | 1/1974 | Mannherz et al. | 73/861.17 |
| 4,144,751 | 3/1979 | Yokoyama | 361/154 X |
| 4,204,240 | 5/1980 | Schmoock | 361/152 |
| 4,325,261 | 4/1982 | Freund, Jr. et al. | 73/861.12 |
| 4,339,958 | 7/1982 | Shauger | 73/861.17 |
| 4,370,892 | 2/1983 | Schmoock | 73/861.17 |

Primary Examiner—E. A. Goldberg
Assistant Examiner—Derek S. Jennings
Attorney, Agent, or Firm—Michael Ebert

[57] ABSTRACT

A driver for the excitation coil in the electromagnet of an electromagnetic flowmeter, wherein the fluid to be metered is conducted through a flow tube to intersect the transverse magnetic flux field created by the electromagnet. The driver includes an a-c line rectifier whose output is coupled to the coil by a pair of switching transistors, the control electrodes of which are connected to the output of a comparator having first and second input terminals. Applied to the first terminal of the comparator is an alternating square wave voltage, each cycle of which has a positive and a negative gating pulse such that the transistors are alternately actuated, the arrangement being such that the rectified output is applied by the transistors to the coil with a polarity which is alternately reversed. The comparator includes a positive feedback loop connected between its output and the first terminal to produce a pulsatory output so that during each negative and positive gating interval, the coil is excited by a train of pulses whose duty cycle is varied in a manner regulating current flow through the coil to maintain a substantially constant current level.

9 Claims, 4 Drawing Figures

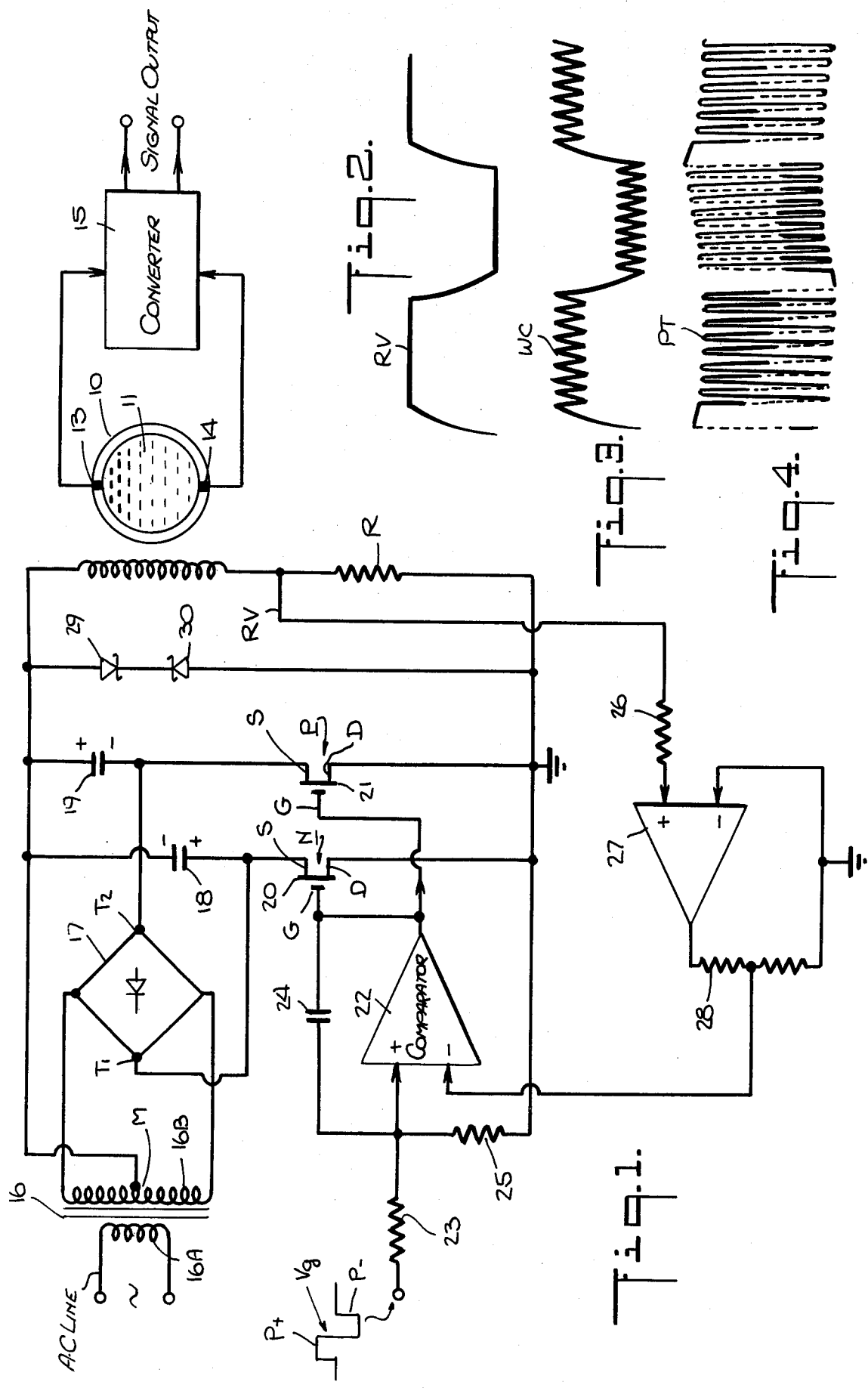

CONSTANT-CURRENT DUTY-CYCLE DRIVER FOR ELECTROMAGNETIC FLOWMETER

BACKGROUND OF INVENTION

This invention relates generally to drive circuits for exciting the coil of the electromagnet of an electromagnetic flowmeter, and more particularly to a constant-current duty-cycle driver for this purpose which maintains current through the coil at a substantially constant level to minimize the presence of unwanted components in the signal yielded by the flowmeter electrodes.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

All of the adverse effects encountered in A-C operation of electromagnetic flowmeters can be attributed to the rate of change of the flux field ($d\phi/dt$), serving to induce unwanted signals in the pick-up loop. When the magnetic flux field is a steady state field, as, for example, with continuous d-c operation, the ideal condition $d\phi/dt=0$ is satisfied. But, as previously noted d-c operation to create a steady state field is not acceptable, for galvanic potentials are produced and polarization is encountered.

In the patent to Mannherz et al., U.S. Pat. No. 3,783,687, there is disclosed an electromagnetic flowmeter in which the excitation current for the electromagnetic coil is a low-frequency wave serving to produce a periodically-reversed steady state flux field, whereby unwanted in-phase and quardrature components are minimized without giving rise to polarization and galvanic effects.

In this prior patent, the driver system for exciting the coil includes a switching means acting to periodically reverse the raw output of an unfiltered full-wave rectifier operated from an a-c power line. Because the electromagnet has a relatively high inductance, it functions as a filter choke which takes out a substantial percentage of the ripple component in the raw output of the rectifier, thereby obviating the need for filter capacitors. In this drive system, a logic circuit or divider is provided which is activated at the power line frequency (i.e., 50 or 60 Hz) to produce low frequency gating pulses for governing the electromagnetic reverse switching action.

Drive systems which are presently employed to provide excitation current for an electromagnetic flowmeter of the type disclosed in the Mannherz et al. patent utilize a constant-voltage drive. The long L/R time constant of the electromagnet produces a relatively slow magnet current rise time hence a long excitation period is required to attain a constant flux level.

Because the total voltage and R are large, to reduce the magnet time constant to usable values, a substantial amount of power has to be dissipated by the drive system. As a consequence, a great amount of energy is lost in heat and the system is inefficient in power terms.

My prior 1980 U.S. Pat. No. 4,204,240 (Schmoock), whose entire disclosure is incorporated herein by reference, discloses an energy-efficient driver for the excitation coil of an electromagnetic flowmeter in which the driver is gated at a periodic rate that is low relative to the frequency of the A-C line voltage, the driver producing a flow of current through the coil which is at a substantially constant level.

In one embodiment of the driver disclosed in the Schmoock patent, during each gating period, high voltage pulses are applied intermittently to shock excite the coil, the respective durations of the pulses being varied so as to maintain the current passing through the coil at a substantially constant level. To this end, fluctuations in the coil current are sensed to effect corrections therefor, thereby taking into account A-C line voltage variations and other variables.

Also pertinent to the present invention are the 1982 patent to Freund et al, U.S. Pat. No. 4,325,261 and the 1979 patent to Yokayama U.S. Pat. No. 4,144,751, these patents disclosing excitation coil drivers for electromagnetic flowmeters.

SUMMARY OF INVENTION

In view of the foregoing, the main object of this invention is to provide an energy-efficient driver for the excitation coil of an electromagnetic flowmeter adapted to generate a current flow through the coil whose level is maintained at a substantially constant level, thereby minimizing the presence of unwanted components in the signal yielded by the electrodes of the flowmeter.

A significant advantage of the present invention is that it accomplishes the same results as that achieved by the drivers disclosed in the prior Schmoock patent but with a simplified and less costly circuit arrangement.

Also an object of the invention is to provide a driver of the above type which operates efficiently and reliably and which consumes relatively little power.

Briefly stated these objects are attained in a driver for the excitation coil in the electromagnet of an electromagnetic flowmeter, wherein the fluid to be metered is conducted through a flow tube to intersect the transverse magnetic flux field created by the electromagnet. The driver includes an a-c line rectifier whose output is coupled to the coil by a pair of switching transistors, the control electrodes of which are connected to the output of a comparator having first and second input terminals. Applied to the first terminal of the comparator is an alternating square wave voltage, each cycle of which has a positive and a negative gating pulse whereby the transistors are alternately actuated, the arrangement being such that the rectified output is applied by the transistors to the coil with a polarity which is alternately reversed. The comparator includes a positive feedback loop connected between its output and the first terminal to produce a pulsatory output whereby during each negative and positive gating interval, the coil is excited by a train of pulses. The duty cycle of these pulses is varied as a function of a reference voltage derived from the current flowing through the coil and applied to the second input terminal, thereby regulating current flow through the coil to maintain a substantially constant current level.

OUTLINE OF THE DRAWINGS

For a better understanding of the invention as well as other objects and further features thereof, reference is made to the following detailed description to be read in conjunction with the accompanying drawings, wherein:

FIG. 1 is a schematic circuit diagram of a driver in accordance with the invention for an electromagnetic flowmeter;

FIG. 2 shows the waveform of the reference voltage produced in the driver;

FIG. 3 shows the waveform of the current flowing through the excitation coil; and FIG. 4 is the waveform of the pulse trains which cause current to flow through the coil.

DESCRIPTION OF INVENTION

First Embodiment:

Referring now to FIG. 1 there is shown a driver in accordance with the invention for an electromagnetic flowmeter whose primary includes a flow tube 10 through which a fluid 11 to be metered is conducted. An electromagnet having an excitation coil serves to establish a magnetic field transverse to the direction of flow which is parallel to the longitudinal axis of the tube. Electrodes 13 and 14 in contact with the fluid are disposed at diametrically-opposed points on the flow tube on an axis perpendicular both to the longitudinal direction of flow and the transverse magnetic field.

As is well known, a voltage is induced in the fluid whose flow intersects the magnetic field to produce a low level a-c signal at the electrode terminals that reflect the flow rate. This flow-induced signal is applied to a secondary 15 which may be of the type disclosed in the Mannherz et al patent to convert the low-level flow induced signal into a proportional d-c output signal in a range useful for process engineering, i.e. 4 to 20 mAdc.

The driver for energizing excitation coil includes a full-wave rectifier power supply constituted by a transformer 16 whose primary 16A is connected to an a-c power line, the line supplying the usual 50 or 60 Hz current. Transformer 16 is provided with a center-tapped secondary. Secondary 16B is connected to the input of a full-wave bridge rectifier 17, the stepdown ratio between secondary 16B and primary 16A resulting in an unfiltered d-c output voltage between the output of the rectifier 17 at terminals $T_1$ and $T_2$, and the midpoint M of secondary 16B. This, therefore is the high-voltage section of the power supply.

Connected between terminal $T_1$ of the bridge rectifier 17 and midpoint M of the transformer secondary is a filter capacitor 18, while connected between terminal $T_2$ and midpoint M is a filter capacitor 19. Because of this arrangement, the polarity of rectified voltage established across filter capacitor 18 is reversed with respect to that established across filter capacitor 19.

Connected between capacitor 18 and ground is a VMOS N-channel field-effect transistor 20; while connected between capacitor 19 and ground is a P-channel identical VMOS field-effect transistor 21. A field-effect transistor is a voltage-controlled semiconductor device in which current conduction between the source (S) and drain (D) regions is controlled or modulated by means of a control voltage applied to the control electrode or gate (G). The P and N transistors will turn on and off in opposite polarity of gate voltage. When, therefore, the gates are positive, the N-channel device is "on" and the P-channel device is "off," and vice-versa for a negative gate voltage.

Excitation coil is connected at one end to the secondary midpoint M, the other end being connected through a resistor R to ground. Hence when field-effect rransistor 20 in series with capacitor 18 is rendered conductive by a voltage supplied to its gate G, the rectified voltage established across this capacitor is applied across excitation coil; whereas when transistor 21 in series with capacitor 19 is rendered conductive, the rectified voltage established across this capacitor is applied across the coil, the polarity of the applied voltage depending on which transistor is actuated. When, therefore, transistors 20 and 21 are alternately actuated, the rectified voltage applied to the coil is alternated in polarity.

Gates G of transistors 20 and 21 are both connected to the output of a comparator 22 having a non-reversing (+) input terminal and a reversing (−) input terminal. In practice, comparator 22 may be a commercially-available integrated circuit chip such as the high speed LM 311 comparator marketed by the National Semiconductor Corporation.

Applied to the + input terminal of comparator 22 through a resistor 23 is an alternating square wave gating voltage $V_g$, each cycle of which is constituted by a rectangular positive gating pulse P+ followed by a rectangular negative gating pulse P+ followed by a rectangular negative gating pulse P−. As a consequence, voltage output of comparator 22 is alternatively positive and negative, which acts to alternately actuate transistors 20 and 21 connected to this output, transistor 20 having a positive voltage applied to its drain by capacitor 18 and transistor 21 having a negative voltage applied to its drain by capacitor 19.

Square wave gating voltage $V_g$ has a frequency which is preferably a sub-multiple of the a-c line frequency which may be 50 or 60 Hz. For this purpose, gating voltage $V_g$ may be derived from a frequency divider and pulse shaper coupled to the line.

Connected between the output of comparator 22 and its (+) input terminal is a feedback capacitor 24, a resistor 25 being connected between this input and ground to create a positive feedback loop, thereby generating oscillations at a constant rate determined by the parameters of the circuit. Resistors 23 and 25 function to divide down the square wave gating voltage to a level equal to the desired reference voltage developed across resistor R.

Comparator 22 is arranged to operate as a class-C amplifier; hence the resultant oscillations in the output are not sinusoidal but in the form of a train of pulses having a constant repetition rate. In class-C operation of a vacuum tube amplifier, the grid bias is considerably greater than cutoff so that the plate current is zero in the absence of an input signal at the grid and plate current flows for appreciably less than one half of each cycle of the input signal to produce an output pulse. An equivalent bias condition and pulsatory output current exists in a transistorized amplifier to create the desired pulse train.

The duty cycle of the pulses in the train is varied as a function of current flow in excitation coil 12. Because of a-c line voltage variations and other variables which effect the intensity of the current, current flow through coil 12 tends to fluctuate. These fluctuations are sensed by resistor R in series therewith, across which is developed a corresponding reference voltage RV.

Reference voltage RV is applied through resistor 26 to the non-inverting (+) input of an operational amplifier 27 whose inverting (−) input is grounded, the output of the amplifier being connected to a voltage divider 28 whose tap is connected to the inverting (−) input of comparator 22. Amplifier 27 is optional and may, in practice, apply reference voltage RV directly to comparator 22.

The voltage applied to the inverting input of comparator 22, which is proportional to reference voltage RV and therefore reflects fluctuations in current passing through excitation coil 12. This acts to modulate the bias on the class-C amplifier and thereby vary the duty cycle of the train of pulses yielded by comparator 22 in a manner correcting for the current fluctuations to maintain current flow through the coil at a substantially constant level. The resultant steady state magnetic flux field in the flowmeter provides the desired operation.

Thus, during the positive gate P+ interval, the first transistor 20 is actuated by a train of pulses whose duty cycle is modulated to cause current to flow in one direction through coil 12 at a constant level, while during the negative gate P-interval transistor 21 is similarly actuated to cause current to flow in coil 12 at a constant level in the reverse direction.

Shunted across the series circuit formed by coil 12 and resistor R is a pair of zener diodes 29 and 30 in series opposition to limit the flyback voltage during the turn-off period of the electromagnet this voltage being two or three times greater than the drive voltage.

FIG. 2 shows the waveform of reference voltage RV developed across reference resistor R, and FIG. 3 shows the waveform WC of current flowing through excitation coil 12. While waveform WC displays a distinct ripple component, because the electromagnet of the flowmeter has a relatively high inductance, it functions as a filter choke which in conjunction with filter capacitors 18 and 19 smooth out substantial portions of the ripple component. FIG. 4 shows the pulse trains PT generated during the gating intervals.

Had the comparator been operated in a class-A mode, transistors 20 and 21 would then be operating continuously during their respective gating intervals and the load on transformer 16 would then be continuous, resulting in heavy power dissipation and heating. But with the present comparator arrangement which operates in a class-C mode, significantly less energy is required to operate the driver, and the system runs at a lower and safer temperature.

While there have been shown and described preferred embodiments of a constant-current duty-cycle driver for electromagnetic flowmeter, in accordance with the invention, it will be appreciated that many changes and modifications may be made therein without, however, departing from the essential spirit thereof.

I claim:

1. In an electromagnetic flowmeter provided with a flow tube having a pair of electrodes mounted at diametrically-opposed positions thereon, and an electromagnet having an excitation coil to produce a transverse magnetic field within said tube, the voltage induced in the liquid passing through said tube and intersecting said field being transferred to the electrodes to provide a flow-induced signal; an energy-efficient driver to excite said electromagnet, said driver comprising:

A. a full-wave rectifier connectable to an a-c line supplying power having a predetermined frequency and producing a rectified voltage;
B. a first transducer so connected between the rectifier and the coil as to apply the rectified voltage thereto in one polarity when this transistor is rendered conductive;
C. a second transistor so connected between the rectifier and the coil as to apply the rectified voltage thereto in the reverse polarity when this transistor is rendered conductive;
D. pulse generating means to generate a train of pulses having a constant repetition rate and a variable duty cycle;
E. Gating means to alternately actuate the transistors at a predetermined gating rate with said train of pulses whereby the rectified voltage is intermittently applied to the coil during successive positive and negative gating intervals whereby current is caused to flow in the coil, first in one direction and then in the reverse direction; and
F. Means responsive to current flow in said coil to produce a control signal which is applied to the pulse generating means to vary the duty cycle of the pulses in the train to correct for fluctuations in said current to produce current flow in the coil at a substantially constant level.

2. A driver as set forth in claim 1, wherein said rectifier is a full wave bridge rectifier having first and second output terminals, the input of said bridge being connected to the secondary of a transformer whose primary is coupled to said a-c line, said secondary having a centertap connected through said coil and said first transistor to said first output terminal, said centertap also being connected through said coil and said second transistor to said second output terminal.

3. A driver as set forth in claim 2, further including a first filter capacitor connected between said centertap and said first output terminal, and a second filter capacitor connected between said centertap and said second output terminal.

4. A driver as set forth in claim 1, wherein said train of pulses is produced by a class-C amplifier having a positive feedback loop.

5. A driver as set forth in claim 1, wherein said transistors are field-effect transistors having gates to which said trains of pulses are applied.

6. A driver as set forth in claim 5, wherein said gating means is constituted by a comparator whose output is connected to said gates and through a positive feedback capacitor to a non-inverting input to which is applied a square wave gating voltage, each cycle of which has a positive and a negative gating pulse which causes said comparator output to alternately actuate the transistors, said comparator functioning as a class-C amplifier which as a result of the positive feedback oscillates to produce said train of pulses, said comparator having an inverting input to which is applied a reference voltage that depends on the intensity of current flow in said coil and which acts to vary the duty cycle of the pulses accordingly.

7. A driver as set forth in claim 6, wherein said reference voltage is derived from a resistor in series with said coil.

8. A driver as set forth in claim 7, wherein said reference voltage acts to vary the bias of said class-C amplifier.

9. A driver as set forth in claim 1, wherein said geting rate is low relative to the frequency of the a-c line.

* * * * *